(No Model.) 3 Sheets—Sheet 3.
A. CAMPBELL & A. C. MARABLE.
DEVICE FOR RAISING AND LINING RAILWAY TRACKS.
No. 601,459. Patented Mar. 29, 1898.
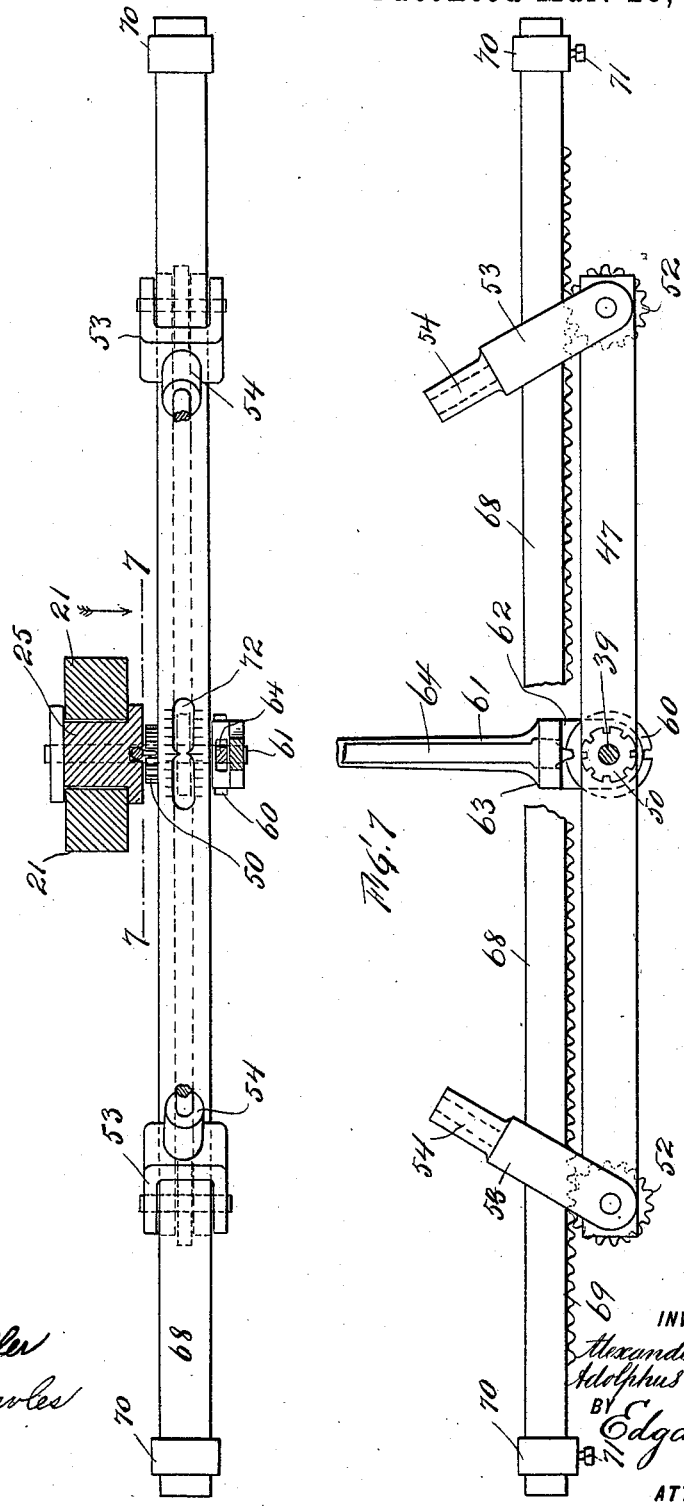

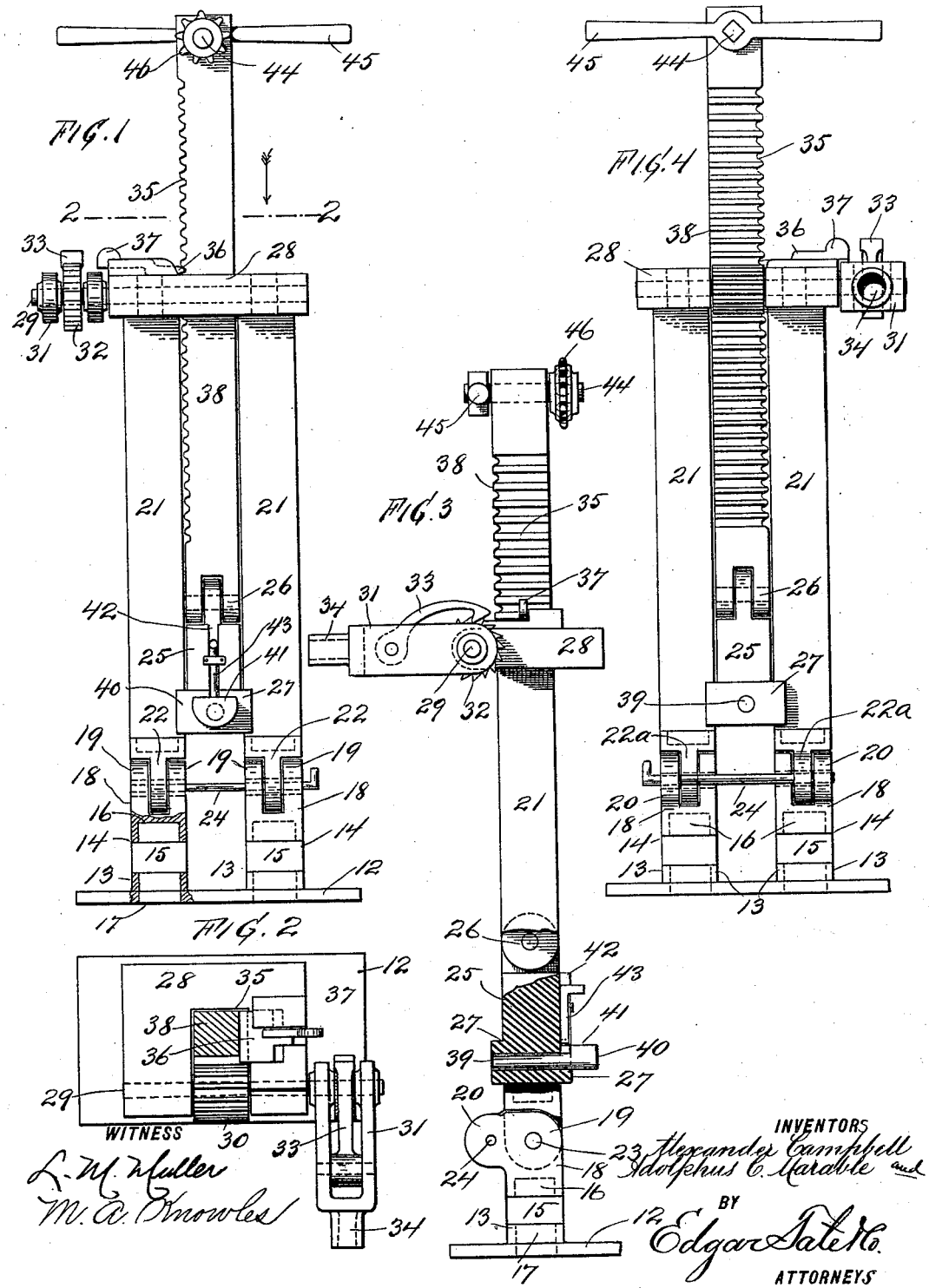

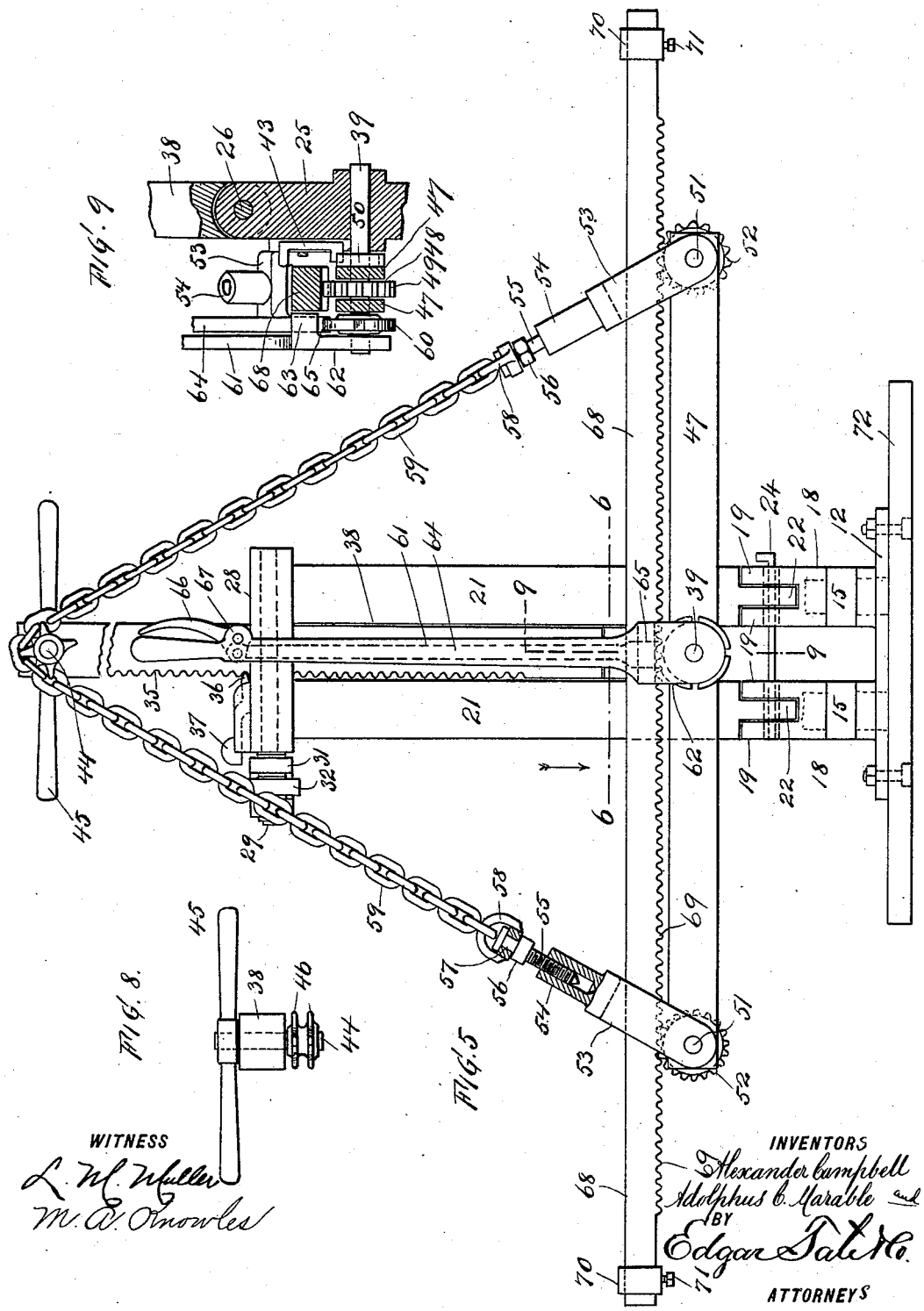

UNITED STATES PATENT OFFICE.

ALEXANDER CAMPBELL AND ADOLPHUS C. MARABLE, OF ARCHER, FLORIDA.

DEVICE FOR RAISING AND LINING RAILWAY-TRACKS.

SPECIFICATION forming part of Letters Patent No. 601,459, dated March 29, 1898.

Application filed December 15, 1897. Serial No. 661,997. (No model.)

*To all whom it may concern:*

Be it known that we, ALEXANDER CAMPBELL and ADOLPHUS C. MARABLE, citizens of the United States, residing at Archer, in the county of Alachua and State of Florida, have invented certain new and useful Improvements in Devices for Raising and Lining Railway-Tracks, of which the following is a full and complete specification, such as will enable those skilled in the art to which it appertains to make and use the same.

This invention relates to what are known as "track jacks and lining machines" for use on railways; and the object thereof is to provide an improved device of this class by means of which a railway-track consisting of the ties and rails may be raised and moved from side to side, so as to properly line and adjust the same.

The invention is fully disclosed in the following specification, of which the accompanying drawings form a part, in which—

Figure 1 is a front view of one form of a track jack and liner made according to our invention; Fig. 2, a transverse section on the line 2 2 of Fig. 1; Fig. 3, a side view of the device as shown in Fig. 1, part of the construction being shown in section; Fig. 4, a back view thereof; Fig. 5, a view similar to Fig. 1, showing a modified form of construction; Fig. 6, a section on the line 6 6 of Fig. 5; Fig. 7, a section on the line 7 7 of Fig. 6; Fig. 8, a top plan view of a vertically-movable rack-bar which forms a part of the construction which we employ and showing the operative devices connected therewith, and Fig. 9 a partial section on the line 9 9 of Fig. 5.

In the drawings forming part of this specification the separate parts of our improvement are designated by numerals of reference in each of the views, and in the practice of our invention, as shown in Figs. 1 to 4, inclusive, we provide a base 12, which is preferably composed of metal and provided with two sockets 13, and connected with said base-plate are two short vertical posts 14, which preferably consist of wooden couplings 15, having upwardly and downwardly directed trunnions 16 and 17, and the lower trunnions 17 enter the sockets 13, formed on the base-plate 12, and the upper trunnions 16 enter corresponding sockets formed in heads 18, and these heads 18 are provided with jaws 19, on which are formed forwardly-directed supplemental jaws 20.

Pivotally connected with the short posts 14 and adapted to swing forward thereon are standards 21, and these standards 21 are provided at their lower ends with circular jaws 22, which fit between the jaws 19 of the posts 14, and passed therethrough is a coupling-pin 23, and the jaws 22 of the standards 21 are provided with backwardly-directed supplemental jaws 22ª, and in practice we also pass through the supplemental jaws 20 and 22ª a locking-pin 24, which is intended to hold the standards 21 in an upright position, and these standards 21 may be folded forward so as to rest upon the ground by removing the locking-pin 24.

Mounted between the vertical standards 21 is a vertically-movable rack-bar 38, which is provided at its lower end with a hanger 25, which is pivotally connected therewith at 26 and which is provided at its lower end and on its opposite sides with transverse shoulders or projections 27, which hold it in position between the standards 21 while permitting it to move vertically.

Mounted on the upper ends of the standards 21 is a head or plate 28, through which the rack-bar 38 passes, and mounted in the rear portion of said head is a shaft 29, which is provided centrally with a pinion or gear 30, which operates in connection with the rack-bar 38, and mounted on the end of said shaft is a yoke 31, between the arms of which is mounted a ratchet-wheel 32, which is rigidly keyed to the shaft 29, and pivoted in said yoke is a pawl 33, which operates in connection with said ratchet-wheel, and the yoke 31 is provided with a socket 34, which is adapted to receive the end of a handle or lever.

The rack-bar 38 is provided in one side thereof with transverse notches or recesses 35, and mounted on the head 28 is a sliding key-plate 36, which is provided with a handle 37 and may be spring-actuated in any suitable manner. In the operation of the key-plate the inner end thereof will engage with the notches or recesses 35 and hold the vertically-movable rack-bar 38 at any desired height or point of adjustment.

In the lower end of the vertically-movable hanger 25 is a removable lifting pin or shaft 39, provided with a head 40, which is flat on the upper surface, as shown at 41, and the hanger 25 is provided with a vertical groove 42, in which is mounted a vertically-movable key-pin 43, the lower end of which is adapted to enter an opening formed in the head 40 of the lifting-pin 39 and to prevent said pin from turning, and the upper end of the vertically-movable rack-bar 38 is provided with a shaft 44, on one end of which is an operating-handle 45, and the opposite end thereof is provided with a sprocket-wheel 46.

The shaft 44 and the parts connected therewith, however, have no function in the form of construction shown in Figs. 1 to 4, inclusive, and are only intended for operation in connection with the form of construction shown in Figs. 5 to 9, inclusive, and the operation of the device constructed as shown in Figs. 1 to 4 will be readily understood from the foregoing description when taken in connection with the accompanying drawings and the following statement thereof.

By placing the head 40 of the lifting-pin under a tie and then manipulating the yoke 31 by means of the handle inserted into the socket 34 the rack-bar 38 will be raised and the rails of the track and the tie raised therewith, this being accomplished by the shaft 29, the pinion or gear 30, the ratchet-wheel 32, and the pawl 33. The entire track may thus be raised to any desired height and held in position by forcing the key-plate 36 inwardly, so as to engage with the notches or recesses 35 in the rack-bar 38, and said rack-bar may be lowered at any time by withdrawing said key-plate and raising the pawl 33, when the rack-bar 38 will fall by gravity, and whenever desirable the entire device, consisting of the standards 21, the rack-bar 38, and the parts connected therewith, may be folded forward, so as to allow a train to pass thereover by folding the yoke 31 adjacent to the standards 21 and withdrawing the locking-pin 24.

In the form of construction shown in Figs. 5 to 9 we provide means for adjusting a track laterally, as well as for raising it, and in this form of construction the lifting pin or shaft 39 is employed, but is different in form from that shown in Figs. 1 to 4, inclusive, and mounted thereon is a walking-beam 47, which is provided centrally with a vertical and longitudinal slot 48, in which is mounted a ratchet-wheel 49, fixed to and carried by and revoluble on the lifting-pin 39, or instead of forming the vertical slot 48 in the walking-beam 47 said walking-beam may be composed of two separate parts, and the hanger 35 is provided with the vertically-movable locking-pin 43, which is adapted to operate in connection with a notched wheel 50, rigidly secured to or formed on one side of the walking-beam 47. Each end of the walking-beam 47 is provided with a short shaft 51, and mounted in each of said ends on said shaft is a gear or ratchet wheel 52, and each end of said walking-beam is also provided with a yoke 53, said yoke being mounted on the end of the shaft 51, and each of said yokes is provided with a tubular head 54, each of which is provided with a screw-threaded bolt 55, and each of said bolts is provided with a head 56, in which is formed an annular groove 57, and connected with each of said bolts by means of a turnbuckle or similar device 58 is a chain 59, and this chain 59 passes over the sprocket-wheel 46 in the upper end of the vertically-movable rack-bar 38, and instead of using a single sprocket-wheel 46, as shown in Fig. 1, we may employ a double sprocket-wheel, as shown in Fig. 8.

The walking-beam 47 is mounted at the front of the standards 21, and secured to the corresponding end of the lifting-pin 39 is a notched wheel 60, and mounted on the end of said pin adjacent to said wheel 60 is an upright lever 61, provided with a head 62, and the head 62 of the lever 61 is provided with a backwardly-directed projection 63, through which passes a vertically-movable locking-bar 64, which is shown in full lines in Fig. 9 and in dotted lines in Fig. 5, and the lower end of said bar is provided with a head 65, which operates in connection with the notches or recesses formed in the wheel 60, and the upper end thereof is provided with a pivoted crank 66, which is also pivoted to the lever 61 at 67, and in operating the crank 66, which is adjacent to the handle of the lever 61, the bar 64 may be raised or lowered as desired.

Mounted over the walking-beam 47 is a longitudinally-movable lifting-bar 68, which is provided on its under side with ratchet or gear teeth 69, and this bar rests on the ratchet or gear wheels 52 and also on the central ratchet or gear wheel 49, mounted centrally of the walking-beam 47, and by operating the lever 61 the lifting-bar 68 may be moved longitudinally, as will be readily understood, and by operating the shaft 44 by means of the handle 45 one end of the walking-beam 47 may be raised and the other lowered, as will also be readily understood, and in this operation the corresponding ends of the lifting-bar 68 are similarly operated, and by means of the locking-pin 43 the walking-beam 47 and the lifting-bar 68 may be locked in any desired position.

The lifting-bar 68 is preferably provided at each end with detachable and sliding collars 70, which may be secured at any desired point by set-screws 71, and in the operation of this form of construction the device is placed between the rails of the track and the separate ends of the lifting-bar 68 are passed beneath the rails or connected therewith in any desired manner, and by raising the vertically-movable rack-bar 38, as hereinbefore described, the rails of the track and the ties may be raised, and then by manipulating the shaft 44 either end of the lifting-bar 68 may be raised or lowered, as will be readily understood. In this operation the collars 70 on the ends of the lifting-bar 68 may be provided with hooks or clamps by means of which connection may be made with the rails, or this connection may be made in any desired manner, and the lifting-bar 68 is provided centrally of the upper surface thereof, as shown at 72 in Fig. 6, with a spirit-level, at each side of which is a scale, whereby the exact position of the lifting-bar may be determined at all times.

Our improved track jack and liner is simple in construction and operation and is well adapted to accomplish the result for which it is intended, and it will be apparent that changes in and modifications of the construction herein described may be made without departing from the spirit of our invention or sacrificing its advantages.

The short posts 18, connected with the base-plate 12, may be composed entirely of one piece, if desired, and may be cast integrally with the base-plate 12, and said base-plate may be secured to a supplemental base 73, as shown in Fig. 5.

Having fully described our invention, we claim as new and desire to secure by Letters Patent—

1. A combination track jack and liner for use on railways, consisting of a base, short vertical posts connected therewith, vertical standards pivotally connected with said posts, and adapted to swing forward, means for locking said standards in a vertical position, a vertically-movable rack-bar mounted between said standards, a head connected with the upper ends of said standards, through which said rack-bar passes, means connected with said head for raising and lowering said rack-bar, and for locking it in any desired position, a hanger pivotally connected with the lower end of said rack-bar, and adapted to move vertically between said standards, and a lifting device connected with the lower end of said hanger, substantially as shown and described.

2. A combination track jack and liner for use on railways, consisting of a base, short vertical posts connected therewith, vertical standards pivotally connected with said posts, and adapted to swing forward, means for locking said standards in a vertical position, a vertically-movable rack-bar mounted between said standards, a head connected with the upper ends of said standards, through which said rack-bar passes, means connected with said head for raising and lowering said rack-bar, and for locking it in any desired position, a hanger pivotally connected with the lower end of said rack-bar, and adapted to move vertically between said standards, and a lifting device connected with the lower end of said hanger, said lifting device consisting of a horizontal walking-beam mounted on a pin which passes through said hanger, and adapted to swing thereon, a longitudinally-movable lifting-bar mounted on said walking-beam, and means for operating said walking-beam, substantially as shown and described.

3. A combination track jack and liner for use on railways, consisting of a base, short vertical posts connected therewith, vertical standards pivotally connected with said posts, and adapted to swing forward, means for locking said standards in a vertical position, a vertically-movable rack-bar mounted between said standards, a head connected with the upper ends of said standards, through which said rack-bar passes, means connected with said head for raising and lowering said rack-bar, and for locking it in any desired position, a hanger pivotally connected with the lower end of said rack-bar, and adapted to move vertically between said standards, and a lifting device connected with the lower end of said hanger, said lifting device consisting of a horizontal walking-beam mounted on a pin which passes through said hanger, and adapted to swing thereon, a longitudinally-movable lifting-bar mounted on said walking-beam, and means for operating said walking-beam, consisting of yokes connected with the ends thereof, a chain connected with said yokes, a shaft mounted in the upper end of the vertically-movable rack-bar, and a sprocket-wheel mounted on said shaft over which said chain passes, substantially as shown and described.

4. A combination track jack and liner for the purpose herein specified, consisting of a base, posts connected with said base, standards pivotally connected with said posts and adapted to swing forward, means for locking said standards in a vertical position, a vertically-movable rack-bar mounted between said standards, a hanger connected with the lower end thereof, a walking-beam pivotally connected with said hanger, a sliding lifting-bar mounted on said walking-beam, and means for operating said parts, substantially as shown and described.

5. A combination track jack and liner for the purpose herein specified, consisting of a base, posts connected with said base, standards pivotally connected with said posts, and adapted to swing forward, means for locking said standards in a vertical position, a vertically-movable rack-bar mounted between said standards, a hanger connected with the lower end thereof, a walking-beam pivotally connected with said hanger, a sliding lifting-bar mounted on said walking-beam, and means for operating said parts, said walking-beam being also provided in the upper surface thereof with a spirit-level, substantially as shown and described.

6. A device for the purpose herein described, consisting of a base, posts connected therewith, standards connected with said posts, a vertically-movable rack-bar mounted between said standards, a walking-beam mounted on a shaft connected with the lower end of said rack-bar, a longitudinal lifting-bar mounted on said walking-beam, and means for operating said parts, substantially as shown and described.

7. A track jack and liner for use on railways, said device consisting of a base, short vertical posts connected therewith, standards connected with said base, a head connected with the upper ends of said standards, a vertically-movable rack-bar mounted between said standards, and passing through said head, means connected with said head, for raising and lowering said rack-bar, a lifting pin or shaft connected with the lower end of said rack-bar, a walking-beam mounted thereon, and extending transversely of said standards, a sliding or longitudinally-movable lifting-bar mounted on said walking-beam, and means for operating said walking-beam and lifting-bar, substantially as shown and described.

8. A track jack and liner for railways, consisting of a base, vertical standards pivotally connected therewith, a vertically-movable rack-bar mounted between said standards, a walking-beam pivotally connected with the lower end of said rack-bar, means for locking said walking-beam in a stationary position, a longitudinally-movable lifting-bar mounted on said walking-beam, and means for raising and lowering the opposite ends of said walking-beam and said lifting-bar, substantially as shown and described.

In testimony that we claim the foregoing as our invention we have signed our names, in presence of the subscribing witnesses, this 17th day of November, 1897.

ALEXANDER CAMPBELL.
ADOLPHUS C. MARABLE.

Witnesses:
FRED. CUBBERLY,
D. L. LAMB.